Dec. 20, 1938.  P. M. COLE  2,140,984
COMPUTING SCALE
Filed Dec. 18, 1936  6 Sheets-Sheet 1

INVENTOR
PAUL M. COLE
BY
*James J. Kennedy*
ATTORNEY

Dec. 20, 1938.   P. M. COLE   2,140,984
COMPUTING SCALE
Filed Dec. 18, 1936   6 Sheets-Sheet 3

INVENTOR
PAUL M COLE
BY
James J Kennedy Jr
ATTORNEY

Dec. 20, 1938. P. M. COLE 2,140,984
COMPUTING SCALE
Filed Dec. 18, 1936 6 Sheets-Sheet 4

INVENTOR
PAUL M. COLE
BY
James J. Kennedy
ATTORNEY

Dec. 20, 1938.                P. M. COLE                2,140,984
                           COMPUTING SCALE
                        Filed Dec. 18, 1936        6 Sheets-Sheet 5
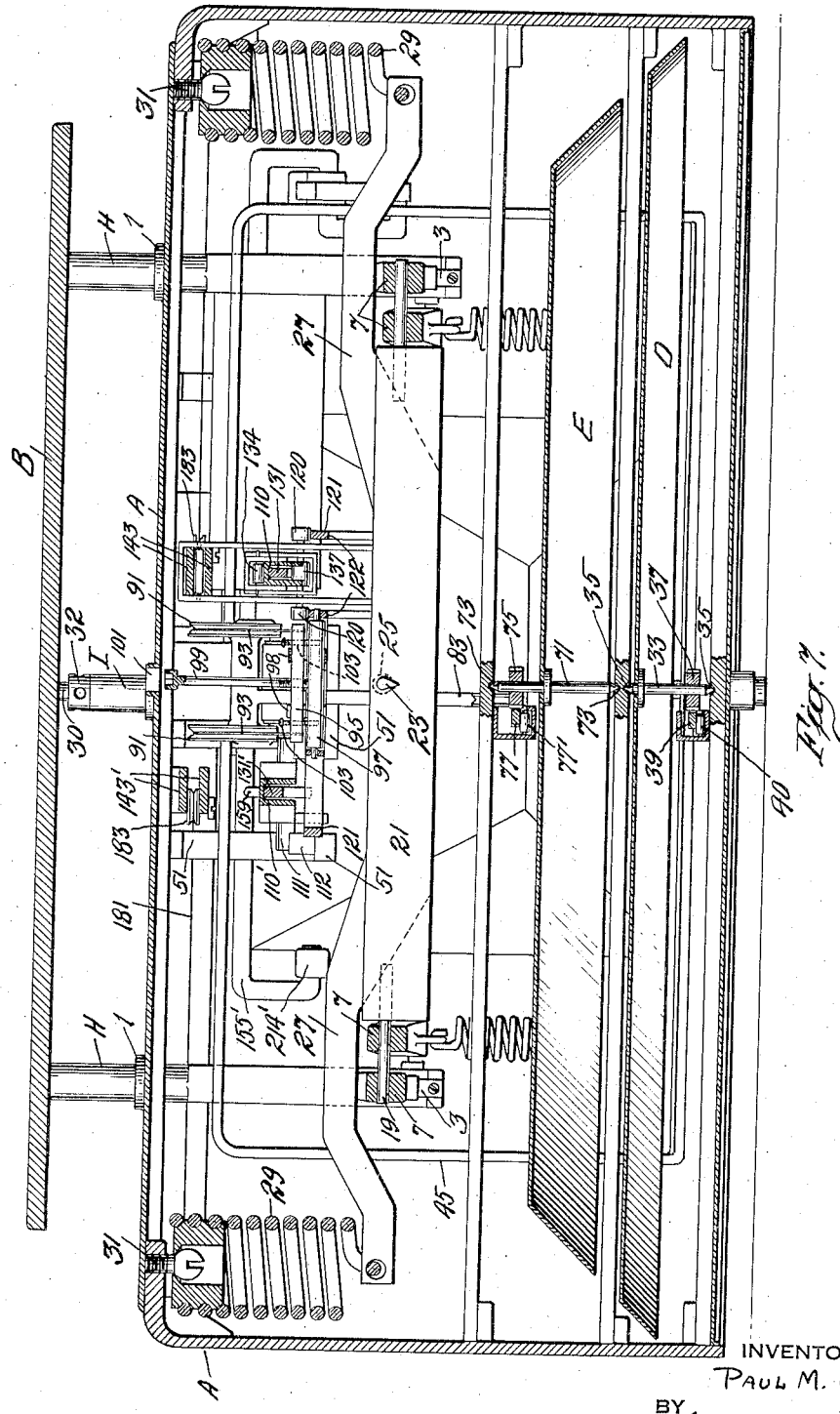
INVENTOR
PAUL M. COLE
BY
James J. Kennedy Jr.
ATTORNEY Dec. 20, 1938.　　　　P. M. COLE　　　　2,140,984
COMPUTING SCALE
Filed Dec. 18, 1936　　　　6 Sheets-Sheet 6
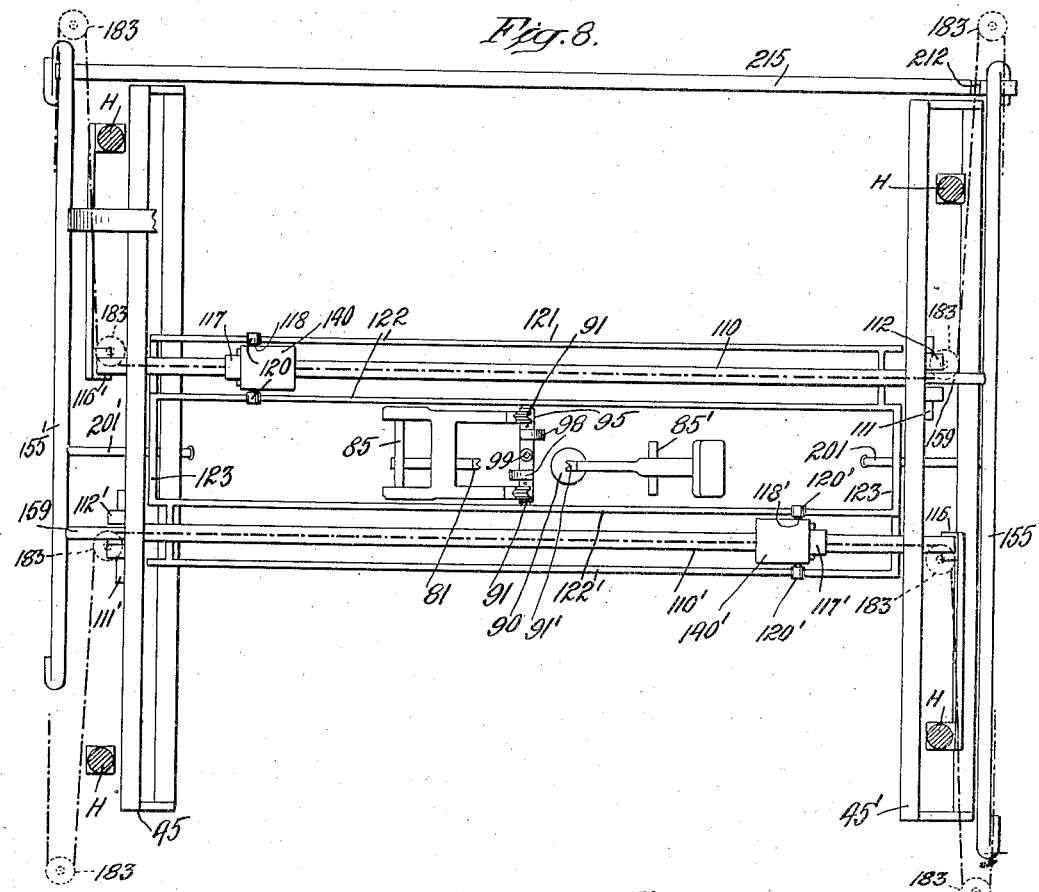
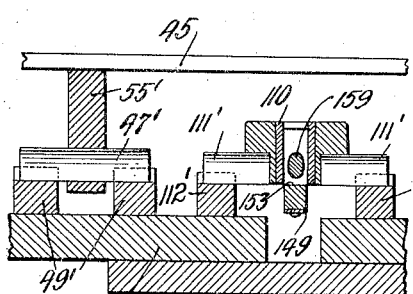
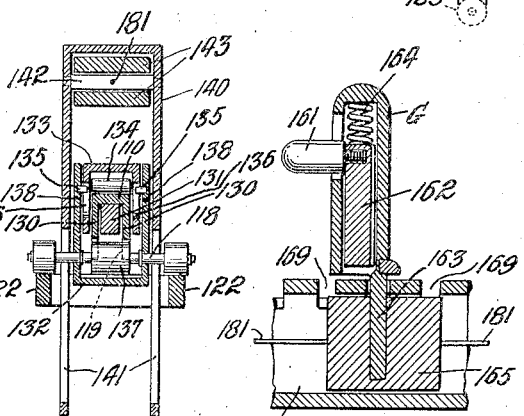
INVENTOR
PAUL M. COLE
BY
James J. Kennedy
ATTORNEY Patented Dec. 20, 1938

2,140,984

UNITED STATES PATENT OFFICE 2,140,984

COMPUTING SCALE

Paul M. Cole, Fort Lee, N. J.

Application December 18, 1936, Serial No. 116,448

6 Claims. (Cl. 265—29)

This invention relates to improvements in computing scales and more particularly to that class of computing scales in which the apparatus is adjusted to a price per unit weight and a single total price is indicated.

It is an object of this invention to provide a scale which furnishes a visual unit price, weight and total price indication on two sides of the scale in a position to be read by, for example, both a merchant and customer and to provide a total price indicator, the subdivisions of which will be of relatively large size and substantially constant, or of the same dimensions for the same variations in price and the same for all unit prices, and without sacrificing these objects to provide for a large range of unit price to which the mechanism may be set.

It is a further object of the invention to provide a computing scale of very small vertical height which will not obstruct the view of the merchant or customer and which may be conveniently used on high counters, an object difficult to attain with most computing scales now in use, in the majority of which a fan or drum type indicator carrying a separate series of price indicia for each price per unit weight is employed.

It is a further object of the invention to provide a computing mechanism, or mechanism adapted to multiply the weight of the mass being weighed by the unit price, which will not be susceptible to shock through sudden movements of the weighing mechanism and will exert a constant reaction against the weighing mechanism regardless of the unit price to which it is set.

It is a further object of this invention to provide manually adjustable means for setting to different prices per unit weight, such that the price setting of the computing mechanism will require little accuracy on the part of the operator and will be accurate regardless of possible slight inaccuracies in the price setting mechanism itself and require no locking device for the weighing mechanism and enable the operator to place the article on the scale before the setting is made or while the setting is being made or after the setting has been made.

Other objects of the invention will appear more in detail in the following description.

With these objects in view, the invention consists in a novel design of a computing scale and its computing mechanism, the preferred embodiment of which is illustrated in the accompanying drawings, in which:

Figures 4 to 7 are vertical sections taken on the correspondingly numbered lines of Figure 3;

Figure 8 is a plan view of certain parts of the apparatus omitted from Figure 3 and showing certain portions of Figure 3 in phantom;

Figure 9 is a fragmentary section taken on the line 9—9 of Figure 3;

Figure 10 is a section taken on the line 10—10 of Figure 8 showing the construction of one of the price setting riders; and Figure 11 is a section through the price setting handle and taken on the line 11—11 of Figure 4.

Figure 1:
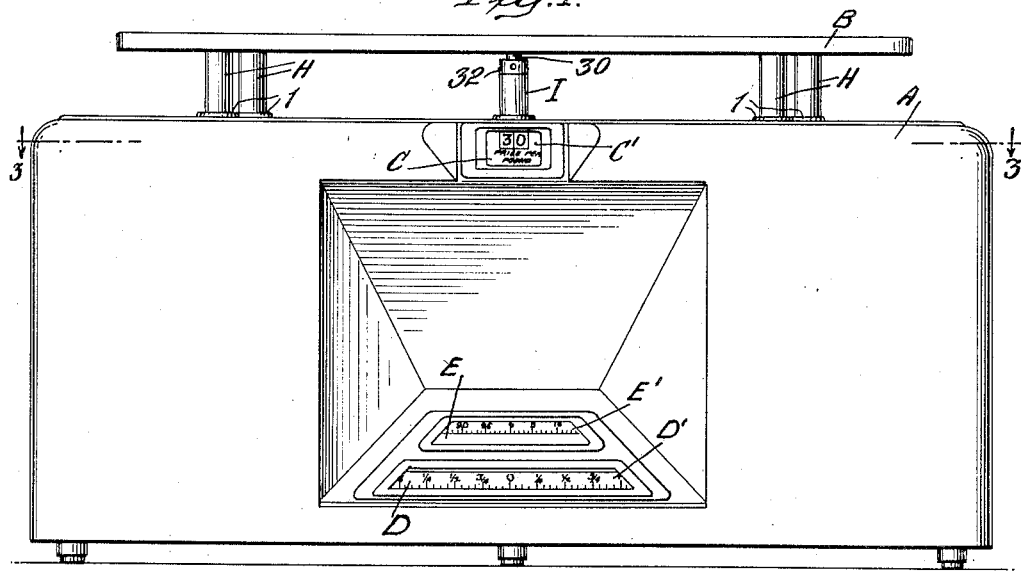
Figure 1 is a front elevation of a computing scale, showing the customer's side of the apparatus.
Figure 2:
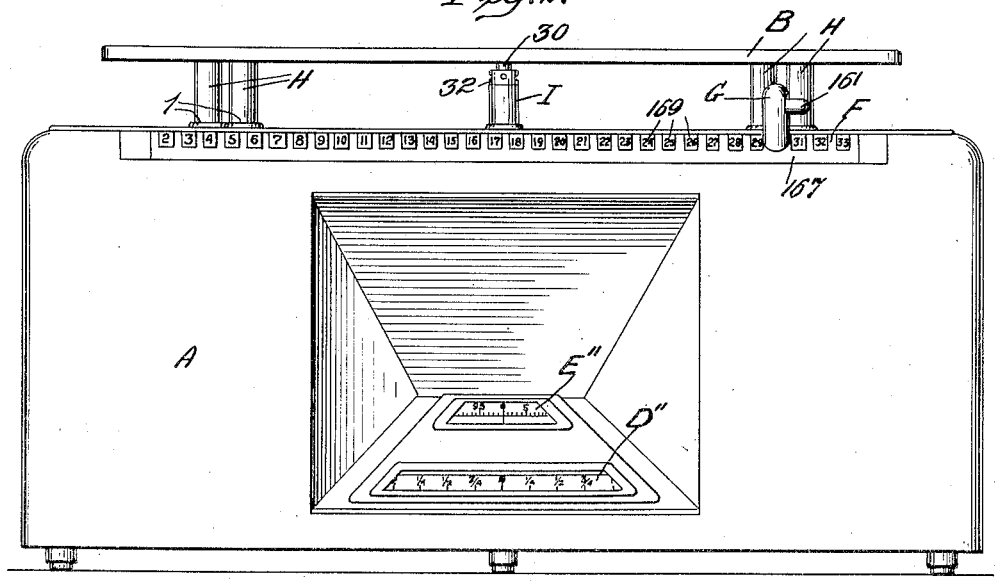
Figure 2 is a rear elevation showing the merchant's or operator's side of the apparatus.

Referring particularly to Figures 1 and 2, the scale casing A is provided on the customer's side (Figure 1) with the usual windows and hair lines (indicated at C', E' and D') for the purpose of reading the price per pound, total price and weight, respectively, from indicating band C and indicating drums E and D, the operation of which is described in detail below. On the merchant's side similar windows for reading the total price E'' and weight D'' are provided, and also a manually operable price setting handle G movable along a slotted tube F provided with unit price indicia. The handle G may also be set to prices double those indicated in Figure 2, furnishing a very large range of price adjustment.

A weighing pan B supported by four posts H is provided, and is connected to the internal mechanism by these posts H and also by an adjustable plunger I.

Weighing system

Figure 3:
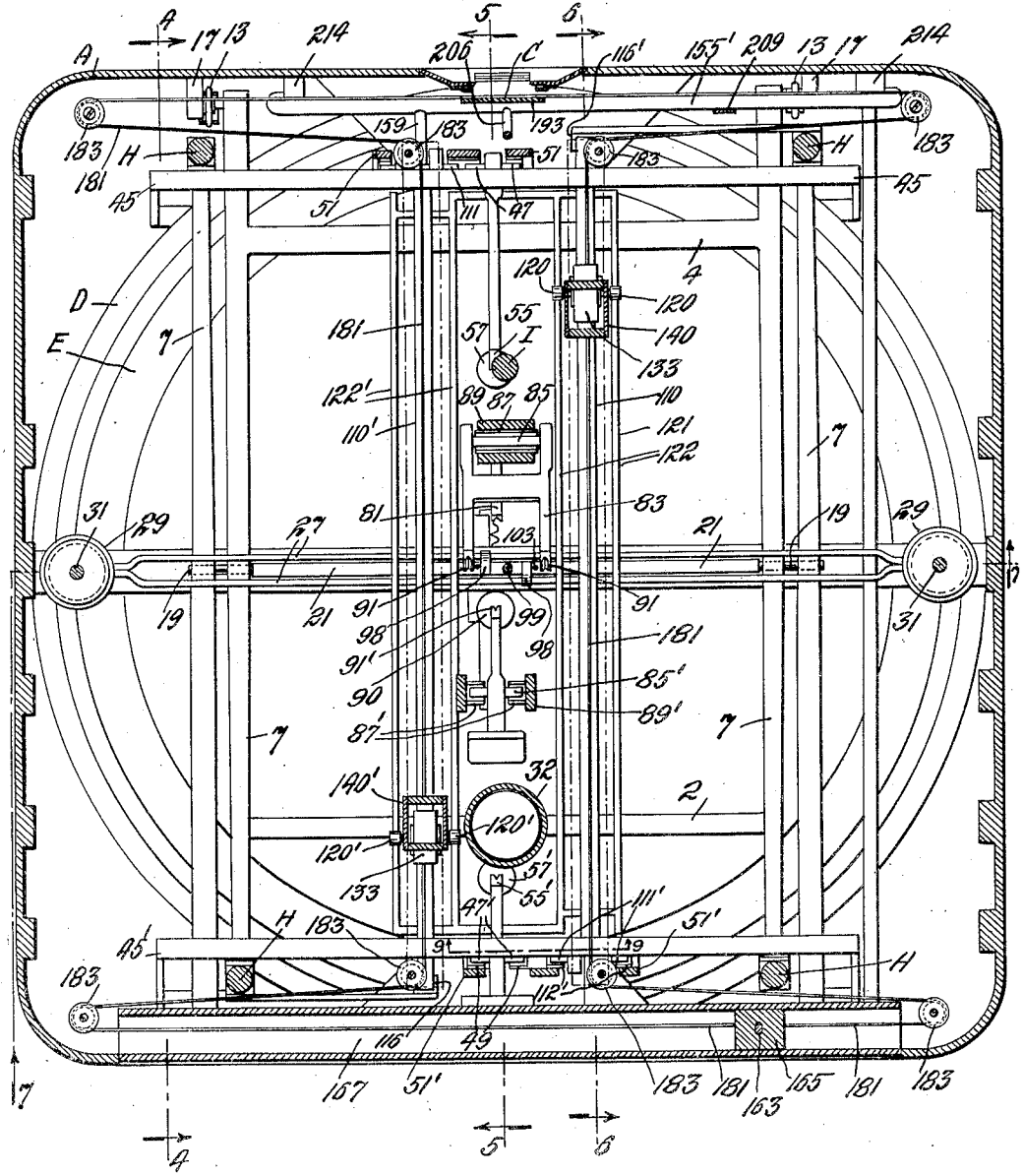
Figure 3 is a horizontal section taken on the line 3—3 of Figure 1 and with certain parts removed.
Figure 4:
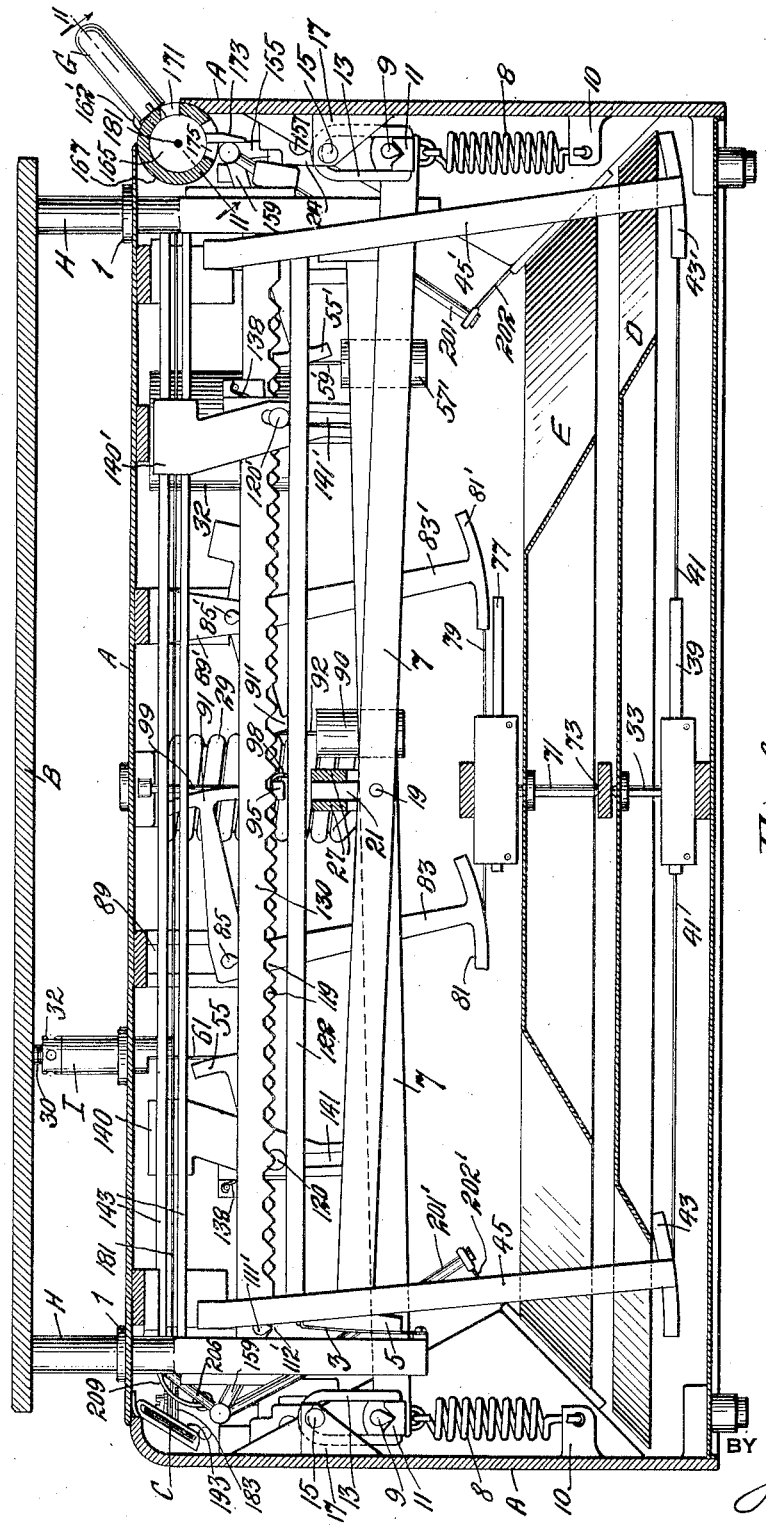

The weighing pan B (see Figures 4, 5 and 7) is supported by posts H which ride freely in sleeves 1 and are in turn suspended by straps 3 from the arcuate ends 5 of four levers 7, the inner two of which are connected by cross pieces 2 and 4. (Figures 3 and 5.) At the opposite ends of members 7 (Figure 4) are provided knife edges 9 resting in V-blocks 11 carried in stirrups 13 which are hung over the bars 15 supported by brackets 17 affixed to the walls of the casing A. Springs 8 with lower ends attached to brackets 10 are provided and serve to hold these knife edges down against the V-blocks. Springs 8 may also be used to compensate for any known deviation of spring 29 from Hooke's law by attaching springs 8 in the proper position below the knife edges 9, as shown in Figure 4, since the connection of springs 8 may be made such as to vary the movement due to their tension according to the pivotal position of arms 7.

Members 7 are pivotally connected by shafts 19, and the arcuate segments 5 at their ends are segments of cylinders concentric about the axis of these shafts, serving to maintain parallel motion of posts H, as straps 3 will be at all times tangential to segments 5 and the portions of these straps suspending the posts H vertical.

Attached to the two shafts 19 is a cross-piece 21 (Figures 3 and 7) having knife edges 23 resting in V-cut-outs 25 formed in a bifurcated member 27, the two ends of which are attached to springs 29 adjustably fastened to the top of the casing A as by means of screws 31.

Through this train of mechanism, the weight of pan B is supported by springs 29, and a weight placed upon the pan will depress it and extend springs 29 in direct proportion to the weight. Oscillation damping means of any usual type, such as the air dashpot 32 attached to cross piece 2 connecting two of the members 7, may be provided.

Weight indicator

Plunger I (Figures 3 and 5) is adjustably secured to the under surface of pan B by a threaded rod 30 biased by a spring 30' and movable relatively to plunger I by a nut 32 which serves to provide for regulation of the zero of weight drum D. The rod 30 is rigidly attached to pan B and may be provided with means such as the pin 31 protruding through slots 31' in the plunger I, to prevent rotation of the plunger I and twisting of the cable 61, described below. This weight indicating mechanism comprises a drum D bearing weight indicia, and carried by a vertical shaft 33 in bearings 35. Shaft 33 also carries a gear wheel 37 driven by a rack 39 resting on rollers 40 and to the rack is attached an operating cable 41.

Cable 41 in turn is attached to a pair of segments 43, 43' at the lower ends of bell cranks 45, 45' pivotally supported by knife edges, 47, 47' in V-blocks 49, 49' on brackets 51, 51' attached to casing A. The other ends of the bell cranks 45, 45' are also provided with segments 55, 55', from which are hung weights 57, 57' by means of the cables 59, 59'. Segments 43, 55 and 43', 55' are respectively concentric about knife edges 47 and 47'. The weights 57, 57' serve to keep cable 41 under tension and to bias the system toward counterclockwise (Figure 5) rotation of bell cranks 45, 45'.

Also attached to segment 55 is a vertical cable 61, the upper end of which is fastened to plunger I and which serves to connect this indicating system to weighing pan B.

Weights 57, 57' are proportioned in relation to the length of the arms of bell cranks 45, 45' so as to provide the bias above referred to, and it will be apparent that this bias will be constant and unaffected by movement of the indicating system. Variation in the moment due to motion of the center of gravity of the bell cranks 45, 45' may be avoided by placing these centers of gravity at the edges of the knife edges 47, 47' or by placing these centers of gravity so that their moments about knife edges 47, 47' are always equal and opposite.

Motion of pan B through this system will be communicated to drum D, producing an angular movement proportional to the linear motion of pan B, and so indicating through windows D', D'', the weight upon pan B.

Price indicating mechanism

A drum E and windows E', E'' similar to those just described but marked with price indicia are provided (Figures 3, 5–7, and 8). This drum is carried by vertical shaft 71 (Figure 5) in bearing 73 and rotated through gear wheel 75 by a rack 77 resting on rollers 77' and to which is attached cable 79 fastened to segments 81, 81' at the ends of bell crank levers 83, 83' carried by knife edges 85, 85' upon V-blocks 87, 87' supported by brackets 89, 89' from casing A. The other arms of bell crank levers 83, 83' are provided with segments 91, 91', these segments, as well as the segments 81, 81' being concentric respectively about the edges of knife edges 85, 85'.

Segment 91 is advantageously made double (Figures 3 and 7) and a pair of cables 93 attached thereto, these pulling upward on a yoke 95 adjustably secured to a cross-piece 97 by means of a screw 99 threaded through yoke 95 and rotatably fastened to cross-piece 97. Play may be taken up by springs 98 drawing cross-piece 97 and yoke 95 together. An opening 101 in the top of the casing A and over the head of screw 99 is provided to permit adjustment of the distance between yoke 5 and cross-piece 97 and this adjustment serves to provide for regulation of the zero of total price drum E. Parts 95, 97 are maintained in alignment by pins 103 borne by the latter and riding in bores in the former.

This price indicating mechanism, similarly to the weight indicating mechanism previously described, exerts a constant upward pull against cross-piece 97, regardless of the position of its parts and serves to convert into a directly proportional angular movement linear movement of cross-piece 97 by the computing or multiplying mechanism about to be described. The bias for this price indicating mechanism is provided by a weight 90 suspended by cable 92 attached to the segment 91', already referred to, serving to keep cable 79 taut and bias bell cranks 83, 83' toward clockwise rotation as shown in Figure 5.

Price computing mechanism

Mechanism for moving cross-piece 97 in direct proportion to the motion of posts H, multiplied by a factor proportional to the price per unit weight for which the scale is set is provided and comprises a system whose reaction against the weighing system is constant regardless of the price per unit weight to which it may be set.

As best shown in Figures 6, 7 and 8, a pair of notched arms 110, 110' are provided, pivoted at opposite ends by knife edges 111, 111' resting in V-blocks 112, 112' carried on brackets 51', 51. The other ends of these arms are supported by two of the posts H through rollers 115, 115' carried upon the arms 110, 110' and resting upon steps 116, 116' attached to the posts H. The depression of any given point along a line between the center of roller 115 or 115' and knife edge 111 or 111' will in consequence be directly proportional to the depression of posts H and hence to the weight upon weighing pan B.

The movement of these arms 110, 110' or, phrased more exactly, of lines along them connecting their respective pivotal axes and the centers of the rollers 115, 115', is thus such that their slope varies proportionally to movement of the weighing mechanism and in particular of the steps 116, 116'. The variation in slope of these arms is thus directly proportional to the vertical movement of any given point along their lengths and approximates, where the angular movement of the arms is small, direct proportionality to this angular movement.

Each of the arms 110, 110' carries a rider 117 or 117', which can be moved along its length and set in various fixed positions by means of shafts 118 or 118' adapted to engage in any of the notches 119 or 119' along the under side of arm 110 or 110', these notches being made so that shaft 118, 118' when in any notch has its center on a line between the center of roller 115, 115' and knife edge 111, 111'.

Price setting mechanism, later to be described, is provided and serves the purpose of setting riders 117, 117' along arms 110, 110' so that they are oppositely positioned with respect to, and at the same distance from, a centrally located line. In the embodiment illustrated, in which the arms 110, 110' are identically constructed and mounted, this will mean that the two riders 117, 117' are at all times located at equal distances from the knife edges 111, 111', respectively, of the arms 110, 110'.

Each of the riders 117, 117' is provided with a pair of rollers 120, 120' mounted on shafts 118, 118' respectively. These rollers 120, 120' engage tracks 122, 122' forming longitudinal members in a frame 121 and connected by the cross members 123 of this frame to form a single rigid structure. The two adjacent inner members 122, 122' of the frame 121 are pivotally connected to cross piece 97 previously referred to in connection with the price indicating mechanism. Cables 93 will exert a constant upward pull through cross piece 97 upon the frame 121, urging it against rollers 120, 120'.

In consequence the vertical position of frame 121 will vary in accordance with the position of the rollers 120, 120'.

The vertical position of the riders 117, 117', due to the mechanism already described, and more particularly the rollers 120, 120', will vary in accordance with two factors: the position of arms 110, 110' themselves, and the position of the riders 117, 117' along these arms. As will be apparent, the depression of each pair of rollers 120, 120' when riders 117, 117' are in a set position will be directly proportional (since they are carried in a position on the beforementioned line between roller 115, 115' and knife edge 111, 111', upon arm 110 or 110', the free end of which rests through roller 115 or 115' upon step 116 or 116' affixed to one of the posts H) to the depression of scale pan B and hence to the weight and also to the indication of weight indicating drum D. The depression of these pairs of rollers 120, 120' will also be directly proportional to their distances, respectively, from knife edges 111, 111' about which arms 110, 110' are pivoted. In the embodiment illustrated the parts are so proportioned and arranged that arms 110, 110', when no weight is upon weighing pan B, will be horizontal so that the price indicating drum will remain at zero regardless of the position of riders 117, 117' upon arms 110, 110'. The essential point of design in this particular is to insure that each of the arms 110, 110' will be at right angles to the line of motion of frame 121 when no weight is upon pan B.

Frame 121, pulled upwardly by cables 93 through cross-piece 97 and stopped by rollers 120, 120' upon the four tracks 122, 122' will move upward and downward in accordance with the position of rollers 120, 120' as determined by the setting of riders 117, 117' along arms 110, 110' and the position of arms 110, 110' controlled by the depression of posts H. The result is that the depression of frame 121 and hence of crosspiece 97 is directly proportional to the weight multiplied by the price per unit weight to which the mechanism is set, and so also is the angular movement of price indicating drum E.

Since the motion of frame 121 is rectilinear and rollers 120, 120' are at all times oppositely located with respect to the pivotal axis of crosspiece 97 and at the same distance therefrom there is no variation in the reaction against the price indicating mechanism of the rollers 120, 120' and consequently no tendency of adjustment of riders 117, 117' to disturb the operation of the price indicating mechanism.

The net bias of the price indicating mechanism, produced by weight 90 supported by cable 92 from segment 91', as already described, is made equal to the total weight of the two riders, allowance being made for the weight of frame 121 and attendant mechanism. Since this bias forces the frame upwardly against the rollers 120, 120' of riders 117, 117' with a constant thrust at all times, its only effect upon arms 110, 110' is to relieve them of the weight of riders 117, 117' and adjustment of these riders will not vary the reaction of arms 110, 110' against the weighing system through the posts H, since the moment of each rider about the pivot point of its arm will at all times be canceled by a contrary equal moment due to the bias.

With riders of relatively light construction and with relatively small angular movement of arms 110, 110' the location of the centers of gravity of the riders may be neglected without exceeding permissible limits of error. Where the effect of this factor becomes sensible, its effect is nullified by constructing the riders 117, 117' so that their centers of gravity are located axially of rollers 120, 120'.

*Price-setting mechanism*

Means is provided for moving riders 117, 117' to set the machine to different prices per unit weight and is manually operable by handle G to release the riders 117, 117' from the notches 119, 119' of arms 110, 110' and to reset them in different notches along these arms corresponding to different prices per unit weight.

The construction of arms 110, 110' and riders 117, 117' is the same, and it suffices to describe in detail arm 110 and rider 117 with their attendant mechanism. Arm 110 is of channel iron shape, having depending flanges 130 in which are formed the notches 119 already referred to (Figures 6 and 10). In the interior of arm 110 is positioned a movable bar 131, the function of which is to disengage rider 117 from notches 119 and permit its movement along the arm 110.

Rider 117 is formed of two telescoped parts of channel iron or U-shape, urged together by springs 138 passing through part 132 and over the ends of rollers 134. Part 132 carries the shaft 118 for rollers 120, and part 133 is provided with two rollers 134 which rest upon arm 110. Part 132 is provided with pins 135 riding in slots 136 in part 133 which serve to maintain vertical alignment of the two parts of rider 117 while permitting a limited extent of relative movement vertically. An enlarged portion 137 of shaft 118 engages in the notches 119 of arm 110 and downward movement of bar 131 will engage this enlarged portion 137 depressing shaft 118 and part 132 of rider 117 to a point where enlarged portion 137 clears the notches 119 and movement of the rider along bar 110 can take place. Correspondingly, lifting of bar 131 results in engagement of the rider with the nearest notch 119 upon bar 110 and sets the rider to the corresponding price.

Bar 131 being depressed and rider 117 consequently free to move, it is slid along arm 110 for price adjustment by means of a slide 140 having large slots 141 through which passes the shaft 118. These slots are made large relative to the diameter of shaft 118 so as to permit the rider 117 to seat accurately in the notch 119 immediately ahead of it when bar 131 rises, and to eliminate contact between the price adjusting mechanism and the price computing mechanism when once the adjustment is made.

The mechanism by means of which bar 131 and movable slides 140 are operated to set slide 117 for different prices will now be described.

Bar 131 is pivotally supported at its ends by cranks 145 from brackets 147 attached to the flanges 130 of arm 110 and is biased into upward or retracted position by spring 149 affixed to it at one end and bearing against a stop 151 upon the adjacent bracket 147.

Bar 131 is provided with a table 153, at its end bearing the knife edges 111 and a U-shaped member 155 pivoted at 157 in brackets upon casing A bears a finger 159 adapted to engage table 153 upon rotation of the U-shaped member 155. This depresses the bar 131, which swings downward and toward the end bearing knife edges 111 (to the right in Figure 6) remaining parallel to arm 110, under control of the cranks 145.

In operating the price adjustment handle G (Figures 4, 6 and 11) the handle is slightly depressed, removing neck 163 of the handle, which joins it to a cylindrical slide 165 within tube 167, from a transverse slot 169 and bringing the neck 163 into registry with a longitudinal slot 171 extending the length of the price indicia bearing portion of tube 167. This motion frees the handle G for setting to the desired price, and also rotates the slide 165 and thereby presses a finger 173 attached thereto against U-bar 155, depressing bar 131, through finger 159 and freeing rider 117, for movement along arm 110. Transverse and longitudinal motion of finger 173 is accommodated by a slot in tube 167 similar to slot 171 but located underneath the tube and of greater width than slot 171. The actions of members 131', 117' are the same as those of their corresponding members (131, 117) the connection between the two sets of members being explained later.

The machine is now freed for price setting and this is accomplished by moving handle G longitudinally along slot 171 until it comes opposite the proper price indication. Attached to slide 165 is a continuous cable or chain 181 guided in a closed circuit by idler pulleys 183 and having two courses directly over the arms 110, 110'. Attached to this cable are the two slides 140 previously referred to which accordingly will move riders 117, 117' along arms 110, 110' a certain number of notches which will be the same as the number of price indications or corresponding transverse slots 169 of the tube 167, along which the handle G is moved, the distance between the notches of arms 110, 110' being the same as the distance between the slots of tube 167.

Along the courses of cable 181 which overlie the arms 110, 110' are provided pairs of tracks 143, 143', each of the slides 140, 140' bearing a pair of cross-pieces 142, 142' extending through the space between the upper and lower track of the corresponding pair of tracks 143 or 143'. This construction serves to support slides 140, 140' slidably above arms 110, 110' and maintain the slides 140, 140' in vertical position at all times.

Handle G, now being opposite the desired price indication, is raised or allowed to rise (due to a bias described below, into the corresponding transverse slot 169 until finger 162' of slide 162 engages the top of slot 169 (Figure 6). This removes fingers 159 and 159' from contact with tables 153, 153' releases bars 131, 131' which are retracted within arms 110, 110' by springs 149, 149' and permits the enlarged portions 137, 137' of shafts 118, 118' to seat accurately in the notches 119, 119' under which they have been positioned approximately by the slides 140, 140', eliminating all contact between the price setting mechanism and the remainder of the apparatus. Slots 141, 141' in slides 140, 140' are always moved to a position central with regard to a notch 119, 119'. These slots are wider than shafts 118' as has been explained, so that regardless of whether riders 117, 117' has been moved forward or backward shaft 118, 118' in seating moves away from that side of the slot with which it was in contact during the adjustment.

Also attached to cable 181 is a band C, riding through a guide 193 in back of window C'. This is marked with prices corresponding to those upon the tube 167 and serves to indicate to the customer the price per unit weight to which the scale is set.

A greater range of price adjustment may be provided for without lengthening the tube 167 or slot 171 and this may be achieved by a price doubling mechanism which doubles the indicated total price and doubles the indicated unit price on the customer's side of the scale. To employ this feature the machine is set for price per unit weight as before, but the finger 161 of handle G is pulled back compressing the spring 164 and freeing finger 162 from the slot 169 and the handle is thrust upward until finger 173 encounters the wall of slot 175. U-bar 155', due to a bias to be described, will follow finger 173 and through arm 201' attached to it pull up a shutter 202' which partly masks price indicating drum E, so that a second scale of prices double those normally displayed through the window E' will be visible. Also attached to U-bar 155' is an arm 206 through which a similar shutter 208 is moved to double the price per unit weight indication upon strip C visible through window C'. Attached to U-bar 155' for rotation therewith is an oppositely extending arm 211. Any rotation of U-bar 155 acts upon the abutment 212 of the rectangular sectioned bar 215 which slides longitudinally in bearings carried in brackets 214, 214' of casing A, and abutment 216 at the other end of bar 215 acts upon the arm 211 of U-bar 155' to rotate this U-bar against the bias or spring 269 through an equal and opposite angle to the rotation of U-bar 155.

The action of members 155', 201' and 202' in doubling the price indication visible through window E' is duplicated, due to the cross connection just described, by members 155, 201, and 202 on the merchant's side of the machine so as to double the price indication appearing in window E''.

Spring 209, already referred to, serves to bias arm 155', counterclockwise as shown in Figure 6, and through the members, already described, connecting U-bars 155' and 155, also biases U-bar 155 clockwise, providing the previously mentioned bias for handle G and fingers 159, 159'.

Operation

While it is believed that the operation of the illustrated embodiment of the invention will be clear from the foregoing description of its component mechanisms, for additional clarity certain features of the general mode of operation of the machine will now be reviewed.

The spring weighing mechanism comprises, as before described, a weighing pan B which is supported by posts H and through intermediate connecting members depends from the springs 29, so that the extension of the springs and, in consequence, the displacement of the pan B and attendant weighing mechanism, will be proportional to any weight placed thereon. In addition to the reaction of the springs 29, the weight indicating and computing mechanism reacts against the weighing system through the plunger I, and steps 116 carried upon two of the posts H. As previously explained, in connection with the description of the weight indicating mechanism and the price computing mechanism, the reaction against the weighing system will be constant and, hence, will not affect the proportionality already referred to.

Depression of the scale pan B will have the effect, through plunger I, cable 61, and segment 55 and its attendant mechanism, of rotating the weight indicator drum D, thus indicating the weight through windows D' and D''. The computing mechanism, as previously explained, comprises means for moving riders 117 along the notched arms 110 in accordance with the setting of handle G to various price indications. Since, as before explained, one end of each of the arms 110, rests upon a step 116 carried by one of the posts H, the depression of the riders 117 will be proportional to the weight multiplied by the price to which the machine is set. In order, therefore, to furnish a total price indication it is necessary only to impart to the total price indicating drum E a rotation proportional to the depression of the riders 117. To eliminate any variation whatever in the reaction of the computing and total price indicating mechanism against the weighing system the two riders 117, 117' are employed. This permits the employment of frame 121 engaging rollers 120, 120' upon riders 117, 117', respectively, the employment of which has important advantages. The attendant mechanism supporting frame 121 is such as to urge it upwardly with a constant thrust, regardless of its position or the position of the total price indicating or price computing mechanism. This upward thrust is made equal to the weight of riders 117, 117' and, in consequence, merely relieves arms 110, 110' of their weight and will not produce a varying moment exerted against the arms in accordance with the position of the riders along them. It is also necessary to prevent variation in the reaction of the riders against the price computing mechanism and this result is achieved by the employment of the symmetrically disposed riders, together with frame 121, as previously described. The two riders being symmetrically disposed about the point of support of frame 121, will exert a constant thrust against it regardless of their position along arms 110, 110', and this is due to the fact that there is no variation in moment due to movement of the riders but only a condition of balance which exists at all times and in which a variation in position of one rider is, in effect, canceled by corresponding variation in position of the other.

The arms 110, 110', as previously described, act as levers, the pivotal axes or fulcra of which are located at the knife edges 111, the weight of the riders 117, 117' being applied downwardly at points intermediate their ends and the supporting force being applied upwardly at the opposite ends of these levers through steps 116 and rollers 115, which constitute means for displacing these levers so as to vary their slope proportionally to movements of the weighing mechanism. The total price indicating mechanism comprises in effect a balance consisting of the frame 121, bell cranks 83, 83', weight 90 and various attendant parts, as already described, by means of which the balance engages the riders 117, 117' through its member 121 and exerts at all times a constant thrust against these riders.

The function performed by riders 117, 117', as already described is double. They constitute primarily means for adjusting the points of engagement of the balance (members 121, etc.) with the levers 110, 110'. They also serve the purpose of providing equal and countervailing moments to neutralize any effect of the thrust of the balance exerted through member 121 upon the levers 110, 110', which would otherwise exist. In performing this latter function the riders 117, 117' may be accurately described as poises in the usual sense of the term although their effect is not ultimately to displace the arms 110, 110' but merely to provide an adjustable bias for these arms by means of which the effect of the bias of the price indicating balance system upon the arms may be neutralized. It will be apparent that the two functions of the riders 117, 117', above referred to, are separable, but for convenience of adjustment, I prefer to form the adjustable means for varying the point of engagement of frame 121 with the levers 110, 110' and the adjustable means for biasing the levers against the thrust of this frame in a common member.

The weight of the riders 117, 117' and the extent of adjustment provided for along the levers 110, 110', will, of course, depend upon the thrust exerted by frame 121 against the levers. This is a factor which can vary widely depending upon the size of the machine generally, the type of work it is intended to do, the permissible error, and the weight and frictional characteristics of the price indicating dial and its associated mechanism. As a limiting case the weight of the riders 117, 117' may be negligible so that they function not as a bias but merely as adjustable means for varying the points of engagement of the price indicating balance with the levers 110, 110'. This limiting case will be approximated where the bias of the price indicating balance in relation to the magnitude of the quantities to be dealt with by the weighing mechanism is so small that variation in the reaction of the price indicating balance against the weighing system is negligible and falls within the permissible limits of error of the machine as a whole. The limiting case would be realized where the price indicating balance has no net bias but constitutes merely a balance system adapted to remain in whatever position it is set and in this case it will, of course, be necessary to employ some suitable form of connection between the balance system and the levers at the points of engagement.

It will be understood that where in the foregoing specification I have referred to a bias as constant, or to various distances as proportion or equal, or to a precise relation between certain angles and directions of movement, and the like, that such statements must be taken in a practical rather than a theoretical sense. It is a great advantage in the apparatus of my invention that extremely accurate and complicated machining of parts is largely avoided so that the design of the machine may be kept within extremely small limits of error and still provide for practical tolerances of commercial manufacture. The practical tolerances will, of course, vary somewhat widely in accordance with the work for which the machine is designed and it will be found in many cases that quite wide deviations from exact relationships may be introduced without exceeding permissible limits of error.

The racks, pinions, and drums of both the price computing mechanism and the weighing mechanism are acted upon by the respective bias of each system and never directly by pan B. Any sudden loading or unloading of pan B will hence not transmit shock to these members, the maximum speed of which is determined only by the magnitude of the bias and the proportions of the parts. Price and weight drums of greater diameter and moment of inertia than would otherwise be possible may thus be used without increasing the wear of racks and pinions.

From the foregoing description it will be apparent that a computing scale has been provided in which proportional movement of weight indicating and total price indicating parts is achieved without variation in the reaction of the computing and weighing systems against each other, regardless of the price per unit weight to which the mechanism may be set, and that this result, moreover, is attained with great simplicity and reliability of construction.

It will be apparent also that various of the mechanisms described and, in particular, the price computing and total price indicating mechanism, in addition to being capable of conjoint use with the other instrumentalities described, are also adaptable to use with different instrumentalities for performing similar functions.

What is claimed is:

1. In a computing scale, and in combination, displaceable weighing mechanism, a pair of levers, means for varying the slope of said levers proportionally to displacements of said mechanism, a price indicator, movable means for engaging both said levers, means for deflecting said price indicator proportionally to displacements of said movable means, and adjustable means for causing said movable means to engage each said lever at points along its length at predetermined distances from its pivotal axis.

2. In a computing scale, and in combination, displaceable weighing mechanism, a pair of levers, means for varying the slope of said levers proportionally to displacements of said mechanism, a price indicator, a movable member adapted to engage both said levers, means for deflecting said price indicator proportionally to displacements of said member and adjustable means for causing said member to engage each said lever at points along its length at predetermined distances from its pivotal axis.

3. In a computing scale, and in combination, displaceable weighing mechanism, a pair of levers, means for varying the slope of said levers proportionally to displacements of said mechanism, a price indicator, a movable member adapted to engage both said levers, means for deflecting said price indicator proportionally to displacements of said member, adjustable means for causing said member to engage each said lever at points along its length at predetermined distances from its pivotal axis, a constant bias for urging said movable member in a predetermined direction toward said levers, and adjustable means for biasing said levers toward said member.

4. In a computing scale, and in combination, displaceable weighing mechanism, a pair of levers, means for varying the slope of said levers proportionally to displacement of said mechanism, a poise carried on each of said levers, said levers being so proportioned and arranged that said poises when set at equal distances from the respective pivotal axes of said levers are symmetrically located with respect to a predetermined line, a balance adapted to engage said poises, said balance having a constant net bias equal to the combined weight of said poises, a price indicator, and means for deflecting said indicator proportionally to displacement of said balance.

5. In a computing scale, and in combination, displaceable weighing mechanism, a pair of oppositely extending levers pivoted for rotation in parallel planes, means for varying the slope of said levers proportionally to displacement of said mechanism, a poise carried on each of said levers, a balance adapted to engage said poises and moveable in a predetermined direction, said balance having a constant net bias in said direction equal to the component in said direction of the combined weight of said poises, a price indicator, and means for deflecting said indicator proportionally to displacement of said balance.

6. In a computing scale, and in combination, displaceable weighing mechanism, a pair of oppositely extending levers pivoted for rotation in parallel planes, means for varying the slope of said levers proportionally to displacement of said mechanism, a poise carried on each of said levers, means for adjusting said poises along said levers to positions equidistant from the pivotal axes of said levers and symmetrically located with respect to a predetermined line, a balance adapted to engage said poises and movable in a predetermined direction parallel to said line, said balance having a constant net bias in said direction equal to the component in said direction of the combined weight of said poises, a price indicator, and means for deflecting said indicator proportionally to displacement of said balance.

PAUL M. COLE.